United States Patent
Garbin et al.

(10) Patent No.: US 12,033,084 B2
(45) Date of Patent: *Jul. 9, 2024

(54) COMPUTING PHOTOREALISTIC VERSIONS OF SYNTHETIC IMAGES

(71) Applicant: Microsoft Technology Licensing, LLC, Redmond, WA (US)

(72) Inventors: Stephan Joachim Garbin, London (GB); Marek Adam Kowalski, Cambridge (GB); Matthew Alastair Johnson, Cambridge (GB); Tadas Baltrusaitis, Cambridge (GB); Martin De La Gorce, Cambridge (GB); Virginia Estellers Casas, Cambridge (GB); Sebastian Karol Dziadzio, Cambridge (GB); Jamie Daniel Joseph Shotton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,429

(22) Filed: May 23, 2022

(65) Prior Publication Data

US 2022/0284655 A1    Sep. 8, 2022

Related U.S. Application Data

(63) Continuation of application No. 16/916,009, filed on Jun. 29, 2020, now Pat. No. 11,354,846.
(Continued)

(51) Int. Cl.
*G06T 15/00* (2011.01)
*G06F 18/2135* (2023.01)
(Continued)

(52) U.S. Cl.
CPC ......... *G06N 3/088* (2013.01); *G06F 18/2135* (2023.01); *G06F 18/22* (2023.01);
(Continued)

(58) Field of Classification Search
CPC ...... G06V 10/82; G06V 40/171; G06N 3/044; G06N 3/045; G06N 3/088; G06F 18/2135;
(Continued)

(56) References Cited

U.S. PATENT DOCUMENTS 11,568,576 B1 * 1/2023 Martinez .................. G06F 18/24
2021/0343063 A1 * 11/2021 Garbin ................ G06F 18/2135
(Continued)

OTHER PUBLICATIONS

Shrivastava A, Pfister T, Tuzel O, Susskind J, Wang W, Webb R. Learning from simulated and unsupervised images through adversarial training. InProceedings of the IEEE conference on computer vision and pattern recognition 2017 (pp. 2107-2116).*
(Continued)

*Primary Examiner* — Phu K Nguyen
(74) *Attorney, Agent, or Firm* — Barta Jones, PLLC

(57) ABSTRACT

There is a region of interest of a synthetic image depicting an object from a class of objects. A trained neural image generator, having been trained to map embeddings from a latent space to photorealistic images of objects in the class, is accessed. A first embedding is computed from the latent space, the first embedding corresponding to an image which is similar to the region of interest while maintaining photorealistic appearance. A second embedding is computed from the latent space, the second embedding corresponding to an image which matches the synthetic image. Blending of the first embedding and the second embedding is done to form a blended embedding. At least one output image is
(Continued)

generated from the blended embedding, the output image being more photorealistic than the synthetic image.

20 Claims, 6 Drawing Sheets

Related U.S. Application Data

(60) Provisional application No. 63/019,872, filed on May 4, 2020.

(51) Int. Cl.
  *G06F 18/22* (2023.01)
  *G06N 3/088* (2023.01)
  *G06V 10/82* (2022.01)
  *G06V 40/16* (2022.01)

(52) U.S. Cl.
  CPC ............ *G06T 15/005* (2013.01); *G06V 10/82* (2022.01); *G06V 40/171* (2022.01)

(58) Field of Classification Search
  CPC ....... G06F 18/22; G06T 15/205; G06T 11/00; G06T 15/005; G06T 2207/20084
  USPC .......................................................... 345/418
  See application file for complete search history.

(56) References Cited

U.S. PATENT DOCUMENTS

| | | | |
|---|---|---|---|
| 2022/0147769 A1* | 5/2022 | Tran | G06V 10/82 |
| 2022/0237751 A1* | 7/2022 | Bradley | G06T 15/503 |
| 2023/0112302 A1* | 4/2023 | Marks | G06T 13/80 |
| | | | 345/419 |

OTHER PUBLICATIONS

Isola P, Zhu JY, Zhou T, Efros AA. Image-to-image translation with conditional adversarial networks. InProceedings of the IEEE conference on computer vision and pattern recognition 2017 (pp. 1125-1134).*

Davidson TR, Falorsi L, De Cao N, Kipf T, Tomczak JM. Hyperspherical variational auto-encoders. arXiv preprint arXiv:1804.00891. Apr. 3, 2018.*

Xian Y, Lorenz T, Schiele B, Akata Z. Feature generating networks for zero-shot learning. InProceedings of the IEEE conference on computer vision and pattern recognition 2018 (pp. 5542-5551).*

Chen L, Zhang H, Xiao J, Liu W, Chang SF. Zero-shot visual recognition using semantics-preserving adversarial embedding networks. InProceedings of the IEEE conference on computer vision and pattern recognition 2018 (pp. 1043-1052).*

Liu H, Yao L, Zheng Q, Luo M, Zhao H, Lyu Y. Dual-stream generative adversarial networks for distributionally robust zero-shot learning. Information Sciences. May 1, 2020;519:407-22.*

Lu YD, Lee HY, Tseng HY, Yang MH. Unsupervised discovery of disentangled manifolds in gans. arXiv preprint arXiv:2011.11842. Nov. 24, 2020.*

Dundar A, Liu MY, Wang TC, Zedlewski J, Kautz J. Domain stylization: A strong, simple baseline for synthetic to real image domain adaptation. arXiv preprint arXiv:1807.09384. Jul. 24, 2018.*

Huang X, Liu MY, Belongie S, Kautz J. Multimodal unsupervised image-to-image translation. InProceedings of the European conference on computer vision (ECCV) 2018 (pp. 172-189).*

* cited by examiner

COMPUTING PHOTOREALISTIC VERSIONS OF SYNTHETIC IMAGES

CROSS-REFERENCE TO RELATED APPLICATION

This application is the continuation of and claims the benefit of U.S. non-provisional application Ser. No. 16/916,009, filed on Jun. 29, 2020, entitled "Computing photorealistic versions of synthetic images," which claims the benefit of provisional application No. 63/019,872, filed on May 4, 2020, entitled "Computing photorealistic versions of synthetic images," the entireties of which are hereby incorporated by reference herein.

BACKGROUND

The generation of synthetic image datasets is of great importance to the development of machine learning solutions. It allows for precise annotations, careful consideration of biases, and creates less concern for the violation of personal privacy than data gathered in the wild or from existing document sources. There are many classes of object such as automobiles, animals, people, faces and others for which it is very difficult to create synthetic images with photorealism in an expected manner.

Generating photorealistic images depicting objects such as people, human faces, animals, automobiles, at scale re-mains a prohibitively difficult task using computer graphics approaches. This is because these require the simulation of light to be photorealistic, which in turn requires physically accurate modelling of geometry, materials, and light sources, for both the object and the surrounding scene. Non-photorealistic renders however are increasingly easy to produce. In contrast to computer graphics approaches, generative models learned from more readily available 2D image data have been shown to produce samples of images of human faces and animals that are hard to distinguish from real data. The process of learning corresponds to a loss of control over the shape and appearance of the generated images. For instance, even simple dis-entangling tasks such as modifying hair independently of a face, which is trivial to accomplish in a computer graphics approach, remains an open research question.

The embodiments described below are not limited to implementations which solve any or all of the disadvantages of known apparatus for computing photorealistic images.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer-implemented method comprising storing, at a memory, a region of interest of a synthetic image depicting an object from a class of objects. A trained neural image generator having been trained to map embeddings from a multi-dimensional latent space to photorealistic images of objects in the class, is accessed. A first embedding is computed from the latent space, the first embedding corresponding to an image which is similar to the region of interest while maintaining photorealistic appearance. A second embedding is computed from the latent space, the second embedding corresponding to an image which matches the synthetic image. Blending of the first embedding and the second embedding is done to form a blended embedding. At least one output image is generated from the blended embedding, the output image being more photorealistic than the synthetic image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in a domain adaptor and neural image generator for images of faces, the system described is provided as an example and not a limitation. As those skilled in the art will appreciate, the present examples work for images depicting other classes of object such as automobiles, people, animals, laptop computers and others.

The term "photorealistic" refers to a synthetic image which is perceived by a human viewer as having the quality of a photograph. A image is more photorealistic than another image when it is perceived by a human view as being more like a photograph since objects depicted in the image appear realistic.

Figure 1:
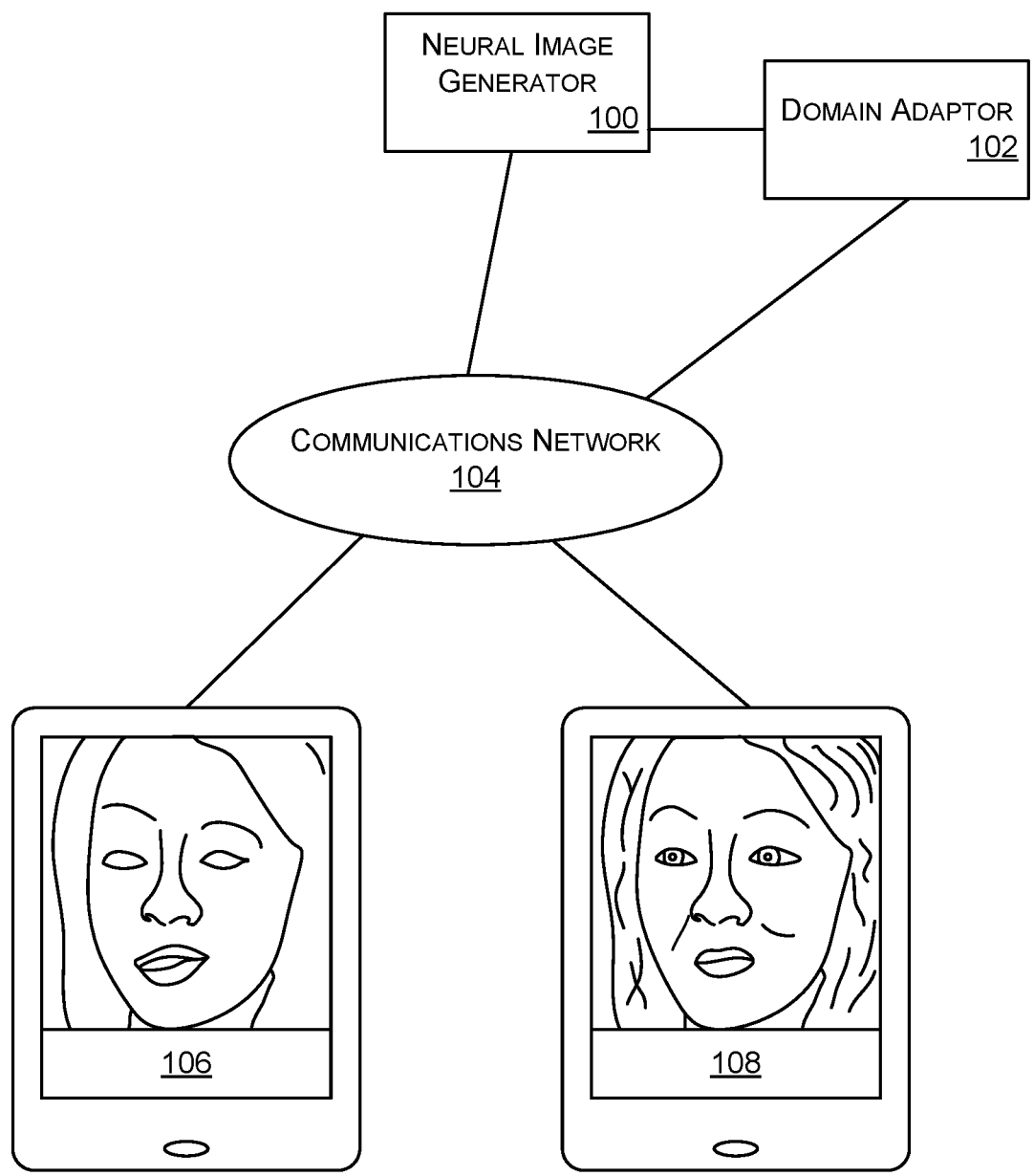
FIG. 1 is a schematic diagram of a domain adaptor deployed with a neural image generator as a web service.
Figure 2:
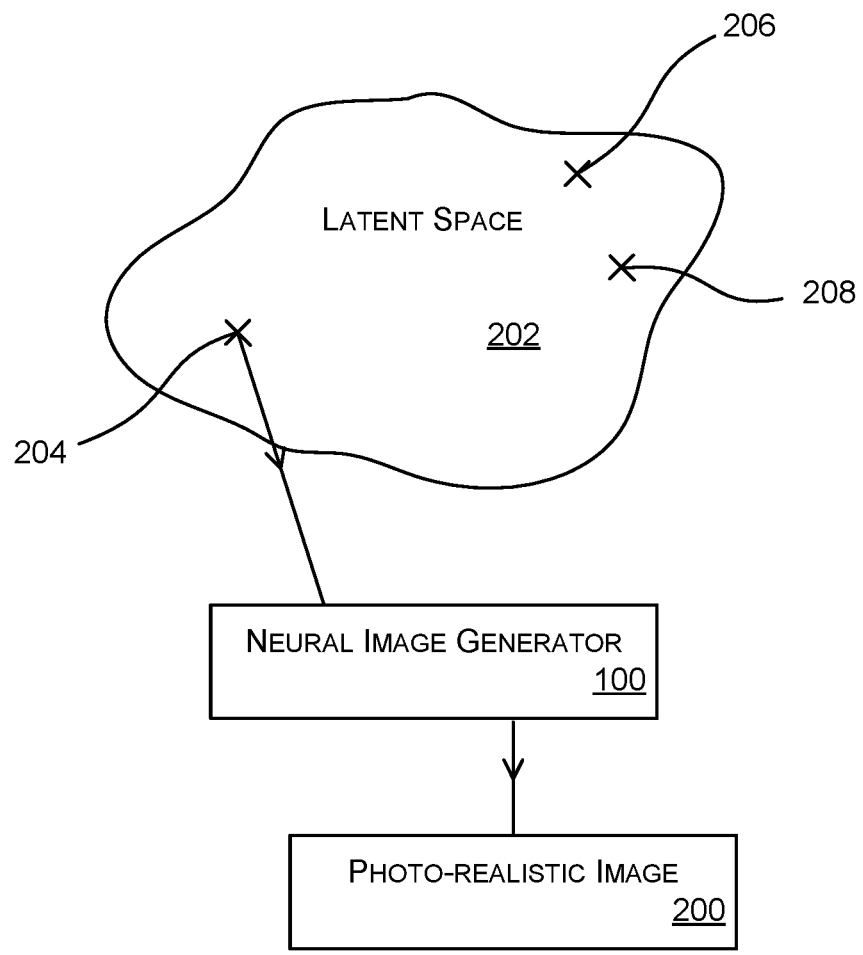
FIG. 2 is a schematic diagram of a neural image generator.

FIG. 1 is a schematic diagram of a domain adaptor 102 deployed with a neural image generator 100 as a web service. The neural image generator 100 comprises a neural network which has been trained using photorealistic images to map embeddings from a multi-dimensional latent space to photorealistic images of objects in a specified class. The neural image generator 100 is described in more detail with reference to FIG. 2. In the example of FIG. 2 the specified class of objects is human faces. However, the technology also works for other classes of object as mentioned above.

The domain adaptor 102 enables the neural image generator 100 to be used for converting synthetic images which are not photorealistic, to photorealistic versions of those synthetic images. The neural image generator 100 has not been trained using synthetic images. By domain adaptation it is meant the ability to make images from dataset A look like images from dataset B, while preserving content. Dataset A has only synthetic images and dataset B has only photorealistic images. The domain of the neural image generator 100 is originally photorealistic images. The domain adaptor 102 enables the domain of the neural image generator 100 to be expanded to include synthetic images which are not photorealistic. The trained neural generator 100 has been trained using only photorealistic images such that zero-shot learning is achieved whereby the trained neural generator takes as input an embedding computed from the synthetic image.

The domain adaptor 102 itself has reduced need for machine learning models. The domain adaptor 102 is used to compute embeddings in the latent space of the neural image generator 100 which are used by the neural image generator 100 to generate output images which are photorealistic versions of synthetic images that have been generated by rendering from a three dimensional (3D) model. The term "render" is well known in computer graphics and refers to the use of techniques such as ray tracing to compute a 2D image from a 3D model of a scene given information about light sources and virtual camera intrinsic parameters.

In the example of FIG. 1 the neural image generator 100 and the domain adaptor 102 are deployed at web servers in the cloud and are in communication with end user devices such as smart phones via communications network 104. The end user devices include wearable computers, mixed reality computing devices, game consoles, desk top computers, laptop computers, tablet computers and others. An end user device is able to send a synthetic image 106 of an object such as face to the domain adaptor 102 via the communications network 104. The domain adaptor 102 and neural image generator 100 generate a photorealistic version of the synthetic image 106 and send the photorealistic version back to the end user device for display such as at 108 in FIG. 1. It is possible for an end user to control how similar to the original synthetic image the output photorealistic image is.

The functionality of the neural image generator 100 and domain adaptor 102 are located locally at the end user device in some embodiments. The functionality of the neural image generator 100 and domain adaptor 102 are shared between the end user device and the server in some embodiments.

Even though the example of FIG. 1 shows schematic images of faces the technology is not limited to face images. Images of other classes of object are used in other examples.

The domain adaptor of the disclosure operates in an unconventional manner to achieve generation of photorealistic versions of synthetic images which are not photorealistic.

The domain adaptor improves the functioning of the underlying computing device by computing an embedding that when used by a trained neural image generator generates a photorealistic version of a synthetic image. A traditional graphics pipeline is therefore usable to generate synthetic images at scale and with significant variety. Annotations available from the traditional graphics pipeline are still valid for the images after domain adaptation. No synthetic images are needed for training and no paired data.

The domain adaptor 102 computes an embedding in the latent space of the neural image generator 100 that produces an image which is perceptually similar to a synthetic sample, but still has the characteristic features of the data the neural image generator 100 was trained with. In terms of the scale space of an image, the domain adaptor matches the coarser levels of an image pyramid to the synthetic data, and replaces fine detail with that of a photorealistic image. Another way to interpret this is that the domain adaptor 102 steers the neural image generator with the help of synthetic data.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

FIG. 2 is a schematic diagram of a neural image generator 100 such as that of FIG. 1. The neural image generator is a neural network. A non-exhaustive list of examples of types of neural network which form the neural image generator 100 is: optimized maximum mean discrepancy network, noise contrastive estimation network, mixture density network, neural autoregressive distribution estimator, real-valued neural autoregressive distribution estimator, diffusion process model, variational autoencoder, generative adversarial network.

The neural image generator 100 has been trained to map embeddings 204, 206, 208 from a multi-dimensional latent space 202 to photorealistic images 200 of objects in a class of objects. Details of how to train a neural image generator 100 to achieve the mapping are well known. In summary, training data comprising photorealistic images of objects in the class are obtained. Samples from the multi-dimensional space are taken, initially at random, and used by the neural image generator 100 to generate an image. During training, a discriminator network differentiates images produced by the generator and those from the training data such that the neural image generator parameters are adjusted to generate images more similar to the training data in future. After training the neural image generator 100 is used without the discriminator network. An example of a neural image generator 100 is given in Karras, T. et al. "Analyzing and improving the image quality of stylegan" 2019 arXiv: 1912.04958 however, the technology is not limited to the neural image generator of that publication.

Figure 3:
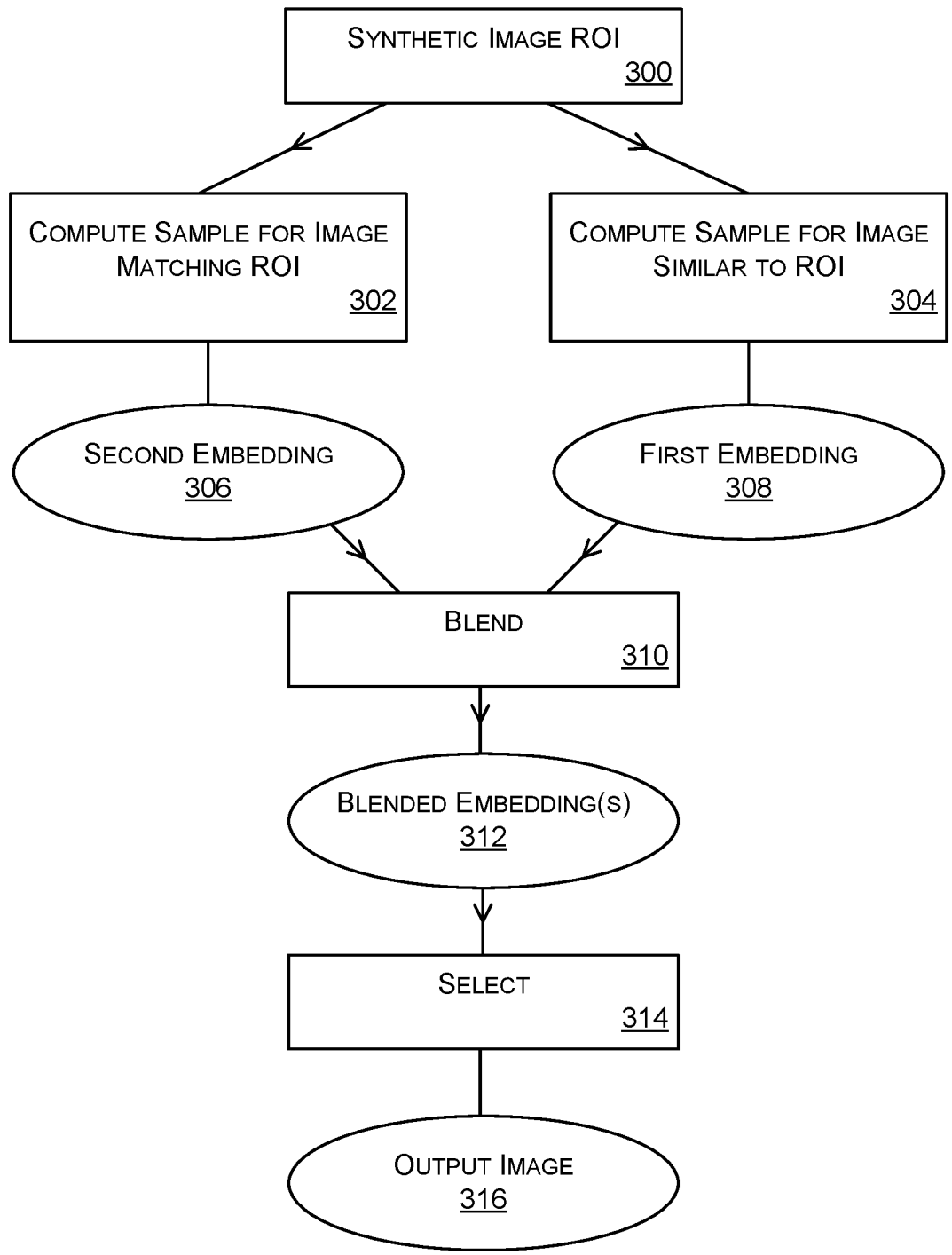
FIG. 3 is a flow diagram of a method of operation at a domain adaptor such as that of FIG. 1.

FIG. 3 is a flow diagram of a method of operation at the domain adaptor 102. The input to the domain adaptor is a region of interest of a synthetic image 300. The region of interest is computed from the synthetic image using any suitable technique such as by computing an alpha mask and using it to identify the region of interest (the alpha mask is available from a synthetic image rendering pipeline used to create the synthetic image in some cases), colour histogram analysis, edge detection, motion parallax in the case that the synthetic image is from a synthetic video, depth analysis in the case that depth information associated with the synthetic image is available, or information from a renderer which was used to render the synthetic image from a 3D model of an object or scene. The technology is workable even where the region of interest is computed approximately.

Using the region of interest of the synthetic image the domain adaptor computes two embeddings 308, 306 in the latent space of the neural image generator. A first embedding 308 is computed at operation 304 in such a way that it corresponds to an image (referred to as an approximate nearest neighbor), generated by the generator, which is similar to the region of interest but not the same as the region of interest and where photorealism is retained. Similarity is measured using any suitable similarity metric such as are well-known in the field of image processing. The first embedding is a closest "real" sample, that is, a sample which gives a photorealistic image which is closest to the synthetic image region of interest. A second embedding 306 is computed at operation 302 in such a way that it corresponds to an image, generated by the generator, which matches the synthetic image region of interest and where photorealism may be reduced. The second embedding aims to give a closest reconstruction of the synthetic image region of interest. A blend 310 of the first embedding 308 and the second embedding 306 is computed to give one or more blended embeddings 312. The blend is computed to retain fine detail from the first embedding 308 and to retain coarse detail from the second embedding.

The first and second embeddings are computed in parallel although it is not essential to do so.

A selection is made automatically at operation 314 to select one of the blended embeddings. The selection is made using a similarity metric and/or user preference data. An output image is generated by inputting the selected blended embedding to the neural image generator to generate output image 316. Output image 316 is stored and/or displayed. The output image is a photorealistic version of the synthetic image region of interest 300. By using the method of FIG. 3 it is possible to generate photorealistic versions of synthetic images. Large numbers of photorealistic images can be generated in an efficient, controllable manner. The photorealistic images are versions of known synthetic images and so it is possible to control the output image 316 by controlling the input synthetic image. It is also possible to control the blending process by adjusting the proportion of fine detail which is preserved relative to the preservation of the coarse features.

There are various different ways of computing the first embedding and the second embedding. One example of computing the first embedding at operation 304 is now given with reference to FIG. 4.

A "good" initial starting point is found in the latent space 202 of the neural image generator by sampling 400 an approximate nearest neighbour. The "good" initial starting point is an embedding which generates an image which is similar to the synthetic image region of interest. The initial starting point is denoted as the latent code, $w^s$, of an approximate nearest neighbour to a given synthetic input image, $I^s$, found by sampling.

The initial starting point embedding is then refined 402 to give a refined latent code, $w^n$ by traversing the latent space 202 by iteratively combining the initial starting point embedding with other samples from the latent space 202. The combinations are weighted 406 as described in more detail below and an optimization is computed using a loss function which is a combination of a perceptual and L2 loss. The result of the optimization is a refined version of the initial starting point embedding, referred to as the first embedding. The first embedding corresponds to an image, generated by the neural image generator, which is similar to the synthetic region of interest but not the same as the synthetic region of interest, and where photorealism is preserved.

The first embedding is computed in a manner which uses constraints to keep the results belonging to the distribution of photorealistic images. In contrast, other approaches do not retain closeness to the domain of real images and in that case, simply get an image back from the generator that looks exactly like the synthetic input whose appearance we wish to change.

It is noticed herein that samples from the prior distribution usually approximately form a convex set, i.e. that convex combinations of any set of such points mapped through the neural image generator are statistically similar to samples from the data distribution the neural image generator was trained on. It is also noted that showing interpolations between pairs of latent vectors is a strategy for evaluating the quality of the latent embeddings of generative models. In an example, an algorithm which is referred to herein as Convex Set Approximate Nearest Neighbour Search (CS-ANNS), is used in some examples to traverse the latent space while ensuring that the reconstructed images closely adhere to a prior distribution of the latent space. More detail about CS-ANNS is given below.

Other examples of computing the first embedding at operation 304 include brute force search by sampling the image generator's prior distribution until a reasonable match is found. Many variations on brute force search are possible using stratified sampling or importance sampling.

There are various different ways of computing the second embedding. In an example, fit the neural image generator to the synthetic image without any constraint to obtain another latent code $w^f$ that matches $I^s$. One example of computing the second embedding is to use naïve Monte Carlo sampling of points in the latent space and evaluating the samples using a loss function which is a combination of a perceptual and L2 loss in order to search for a closest reconstruction of the synthetic image. Other ways of computing the second embedding include use of brute force search and variations on brute force search without any constraint to obtain a latent code that matches the synthetic image.

The domain adaptor combines $w^f$ and $w^n$ with varying interpolation weights to obtain a set of images that strongly resemble $I^s$, but which have the appearance of real photographs. Because $w^s$, $w^n$ and the results from combining $w^f$ and $w^n$ with varying interpolation weights are valid proposals for the final result, the domain adaptor selects the latent code that gives an image as semantically similar to $I^s$ as possible from among them.

Figure 4:
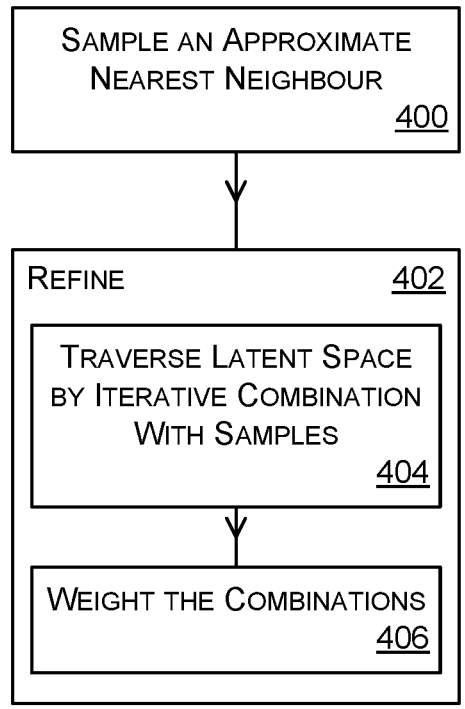
FIG. 4 is a flow diagram of more detail of operation 304 of FIG. 3.

There are various different ways of computing a good initial starting point at operation 400 of FIG. 4 at the beginning of a process of computing the first embedding. One example is to take a sample from a prior distribution of the latent space 202 and take the best match.

Figure 5:
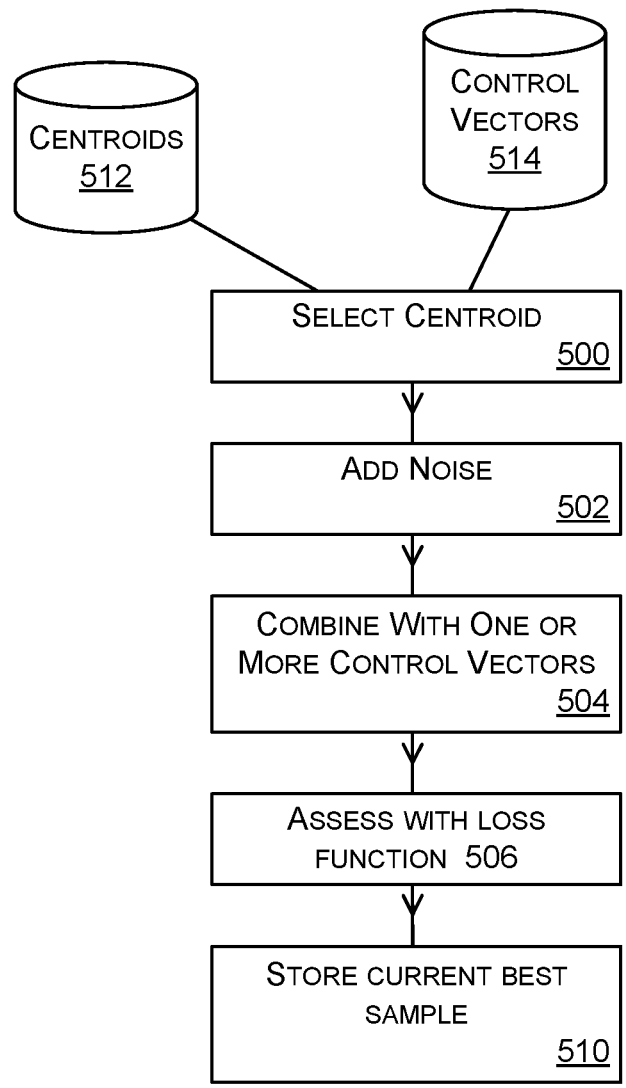
FIG. 5 is a flow diagram of a method of computing an initial sample.

Another example is described with reference to FIG. 5 and gives the benefit of improved photorealism when the synthetic image depicts objects with poses, lighting or other attributes which differ from attributes in the training data used to train the neural image generator. The method of FIG. 5 also gives the benefit of bias control. The neural image generator necessarily inherits the bias of the data it was trained on and often the bias is hard to assess.

A plurality of control vectors 514 are defined manually or using an automated process. A control vector is an embedding in the latent space which has been selected because it corresponds to an image, generated by the neural image generator, having a particular attribute. Individual ones of the control vectors 514 are selected to correspond to different attributes. In the case of human faces, examples of attributes are face angle, hair length, bread length, hair curliness. In the case of automobiles, examples of attributes are pose, illumination, colour.

A plurality of centroids 512 are defined manually or using an automated process. A centroid is an embedding in the latent space which has been selected because it corresponds to an image, generated by the neural image generator, having a high level attribute. Individual ones of the control vectors 514 are selected to correspond to different high level attributes. In the case of human faces, examples of high level attributes are sex, age, skin tone. In the case of automobiles, examples of high level attributes are self-driving, manual operation, manufacturer, model.

The domain adaptor selects 500 a centroid at random from the available centroids 512, adds 502 noise to the centroid and combines 504 the centroid with one or more control vectors selected at random in order to vary attributes. The result is assessed using a loss function 506 and stored 510 if it is the current best result. The process ends when a specified number of samples has been assessed.

An example is now given for the case where the images depict faces and the neural image generator is StyleGAN2 (trade mark) as described in Karras, T. et al. "Analyzing and improving the image quality of stylegan" 2019 arXiv: 1912.04958. The example does not limit the scope of the technology since the skilled person understands that images depicting other objects are used in some cases, and other types of neural image generator are used in some cases.

A subset of 2000 samples from StyleGAN2 was annotated with a series of attributes to obtain a set of 33 control vectors, vcontrol. The attributes were gaze direction, beard style, head orientation light direction, degree of mouth open, hair style, hair type, skin texture. A set of centroids is defined, vcentroid, to sample around. The centroids are selected to be somewhat balanced in terms of sex, skin tone and age, and are chosen empirically.

The loss used in the sampling step is a combination of the LPIPS distance, an L1 loss with different weights for colour and luminance, and landmark loss based on 68 points computed with DLIB. The loss is computed at a quarter resolution, after low pass filtering with a Gaussian kernel, and multiplication with the mask Ia. The entire loss function for the sampling step is thus:

$$L_{sampling} = L_{LPIPS}(r(I^s * I^a), r(G(w^s) * I^a)) + \lambda_{lum} * \|y(r(I^s * I^a)) - y(r(G(w^s) * I^a))\|^1 + \lambda_{col} * \|u(r(I^s * I^a)) - u(r(G(w^s) * I^a))\|^1 + \lambda_{landm} + \|l(r(I^s * I^a)) - l(r(G(w^s) * I^a))\|^2 \quad \text{(equation 1)}$$

Where r is the resampling function that changes image size after Gaussian filtering, u separates out the colour channels in the YUV colour space, y the luminance channel, G is the pretrained StyleGAN2 generator, $I_s$ a synthetic image, $w_s$ a latent code sample, and l the landmark detector. $\lambda_{lum}$ is set to 0.1, $\lambda_{col}$ 0.01, and $\lambda_{landm}$ to 1e-5.

For each sample at this stage of pick one of the centroids vcentroid with uniform probability, and add Gaussian noise to it. Combine this with a random sample of control vectors to vary pose, light, expression etc. The i'th sample is thus obtained as:

$$w_i^s = S(v_{centroid}) + \mathcal{N}(0.0, \sigma^2) + v_{control} * N_{uniform} * 2.0, \quad \text{(equation 2)}$$

Where s is the random centroid selection function, $\sigma^2 = 0.25$, and $N_{uniform}$ is uniform noise to scale the control vectors.

The output of this stage is simply the best $w_s$ under the loss in Equation 1, for any of the 512 samples taken.

For the convex set approximate nearest neighbor search, refine $w_s$ while keeping the results constrained to the domain of valid images in StyleGAN2. The intuition is to optimise the weights by which valid samples in the latent space are combined, assuming that any convex combination of them also leads to realistic images when decoded through the generator.

At each step, draw 512 samples using the same procedure as before, just without adding beta, which now becomes a learnable parameter. At each iteration, each of the 512 proposal samples $w_p$ is obtained as:

$$w_i^p = S(v_{centroid}) + \mathcal{N}(0.0, \sigma^2) \quad \text{(equation 3)}$$

Blend these centroid candidates using linear interpolation with the current $w_n$ using a uniform random alpha in the range of 0.25-0.75, found to stabilise the optimisation. Optimize for a set of weights, α, which determine how the $w_i^p$ s and current $w_n$ are combined. Use sets of alpha for each of 18 StyleGAN2 latent space inputs, i.e. alpha is a matrix of shape [512+1, 18] (note how the current $w_n$ is included). Constrain the optimisation to make each row of α sum to 1 using the softmax function, ensuring a convex combination of the samples. In addition to α, allow learned variation for the control vectors, which are scaled by a learnable parameter β. Because this last step could potentially lead to solutions far outside the space of plausible images, clamp β to 2.0.

The loss is the same as Equation 1, just without the landmark term, i.e. with $\lambda_{landm}$ set to 0.

Use 96 outer iterations for which the $w_p$ are redrawn, and α and β reset so that the current $w_n$ is the starting point (i.e. β is set to zero, and alpha to one only for the current $w_n$). For each of these outer loops, optimise α and β using Adam with a learning rate of 0.01 in an inner loop. Divide the initial learning rate by 10.0 for every 4 iterations in that inner loop, and return the best result at any point, which gives the refined $w_n$.

To fit StyleGAN2 to the synthetic image Is, use the StyleGAN2 process with minor modifications based on empirical observation as follows. Set the number of total steps to 1000, the initial learning rate to 0.01, and the initial additive noise to 0.01. These changes are justified as the process starts from $w_n$ and so has a much-improved initialisation compared to the original algorithm. Mask the loss using the same Ia as above.

Having obtained a latent code $w_s$ that closely resembles the synthetic input image Is, and a latent code that describes that approximate nearest neighbour In, combine them in such a way that preserves the overall facial geometry of Is but has the fine detail of In. Use interpolation to do this, i.e. the final latent code is obtained as:

$$w^{final} = w_s * \sqrt{a} + w_n * \sqrt{1.0 - a}, \quad \text{(equation 4)}$$

Where $w^{final}$ is a candidate for the final output image 316. Generate candidates by letting alpha retain the first {1, 3, 5, 7} of the 18 latent codes with a floating point weight of {1.0, 0.9, 0.8, 0.7} each.

Having obtained a sequence of proposals, select the one that matches input most using the Structural Similarity (SSIM) metric which was empirically found to give better qualitative results than the LPIPS distance. Operations 300 to 310 are run a plurality of times with different random seeds to ensure that even difficult samples are matched with good solutions.

The convext set approximate nearest neighbor search algorithm is summarized below:

Result: Refined latent codes, $w_n$
Initialise variables and fix random seeds;

```
For i_outer=0; i_outer<96; i_outer+=1 do
    Sample 512 interpolation candidates;
    Reset learnable parameters;
    Set learning rate, l=0.01;
    For i_inner=0; i_inner<20; i_inner+=1= do
        Compute loss & Update parameters;
        If i_inner %4==0 then
            l=l/10.0;
        end
        Update current w_n if better loss achieved;
    end
end
```

In a user study human annotators were shown three images, the synthetic input, a baseline result obtained using the StyleGAN2 method and the output image 316 from the present technology, in random order. The human annotators were asked if the output image 316 or the baseline is more photorealistic, and which image is the overall most realistic looking, i.e. comparable to a real photograph. Finally, the annotators were asked if the synthetic image and the output image 316 could be the same image of the same person. In this case, each annotator could answer (Definitely No, Slightly No, Slightly Yes, Definitely Yes).

From the annotation of 326 images, output images of the present technology are considered more photoreal than the StyleGAN2 Baseline in 94.48% of cases. In 95.1% of responses, the output images of the present technology were considered more realistic looking than the input or the baseline.

In terms of whether the annotators thought the input and the output images of the present technology could be a photograph of the same person, the responses to the options Definitely No, Slightly No, Slightly Yes, Definitely Yes were selected 18.71, 19.1, 30.67, 31.6 percent of the time. Despite the large gap in appearance, and the fact that the output images of the present technology are designed to alter aspects of the face like freckles which could be considered part of identity, roughly 60% still believed the output images of the present technology sufficiently similar to pass as photograph of the same person at the same moment in time.

Figure 6:
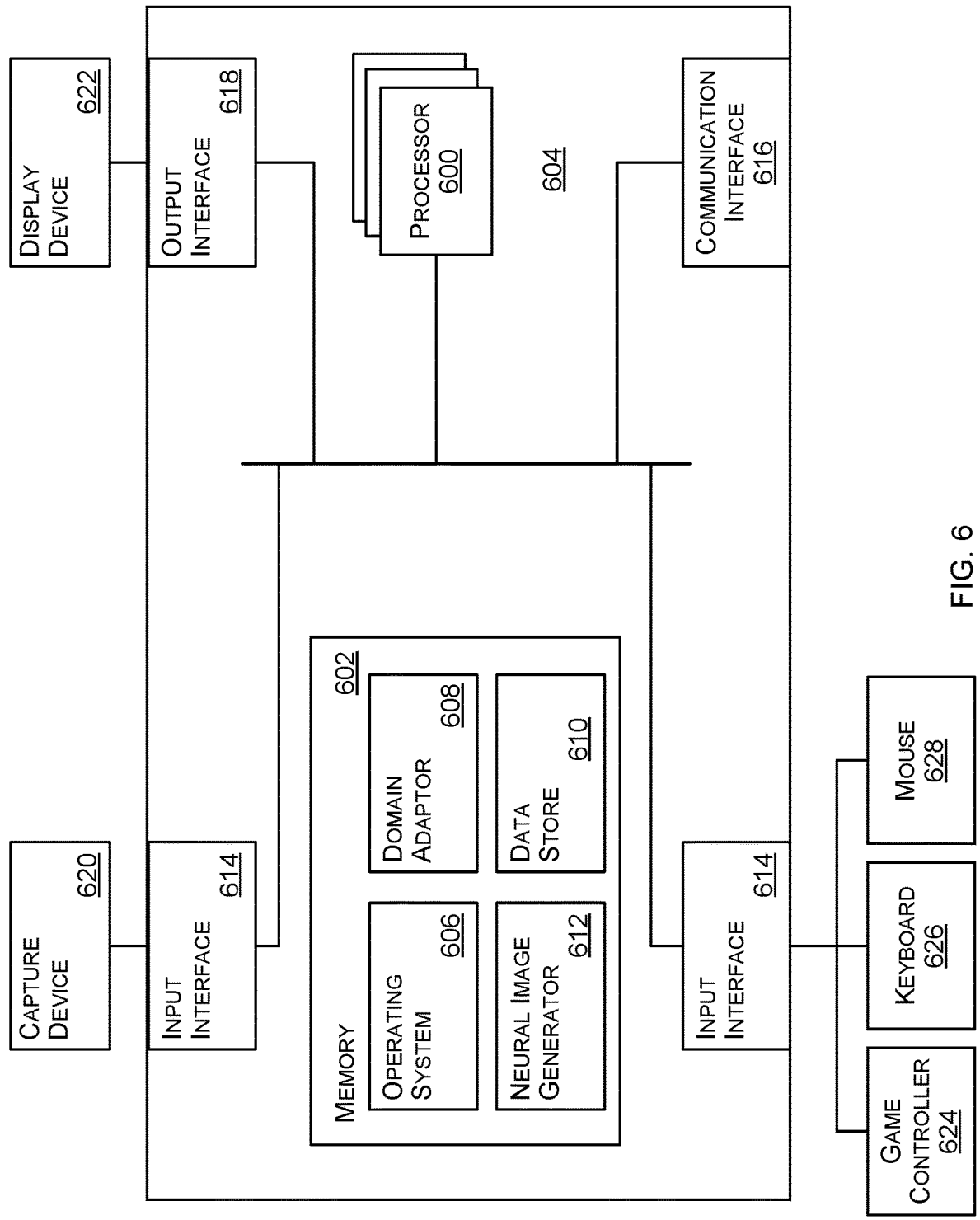
FIG. 6 illustrates an exemplary computing-based device in which embodiments of a domain adaptor are implemented.

FIG. 6 illustrates various components of an exemplary computing-based device 604 which are implemented as any form of a computing and/or electronic device, and in which embodiments of a domain adaptor 608 for enabling a neural image generator that has been trained using photorealistic images only, to be used to generate photorealistic versions of synthetic images, are implemented in some examples.

Computing-based device 604 comprises one or more processors 600 which are microprocessors, controllers or any other suitable type of processors for processing computer executable instructions to control the operation of the device in order to generate photorealistic versions of synthetic images. In some examples, for example where a system on a chip architecture is used, the processors 600 include one or more fixed function blocks (also referred to as accelerators) which implement a part of the method of FIGS. 3 to 5 in hardware (rather than software or firmware). Platform software comprising an operating system 606 or any other suitable platform software is provided at the computing-based device to enable application software to be executed on the device. A neural image generator 612 is available at the computing-based device 604 together with a domain adaptor 608 and a data store 610. The data store 610 holds synthetic images, photorealistic images, centroids, control vectors and other data.

The computer executable instructions are provided using any computer-readable media that is accessible by computing based device 604. Computer-readable media includes, for example, computer storage media such as memory 602 and communications media. Computer storage media, such as memory 602, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 602) is shown within the computing-based device 604 it will be appreciated that the storage is, in some examples, distributed or located remotely and accessed via a network or other communication link (e.g. using communication interface 616).

The computing-based device 604 also comprises an output interface 618 arranged to output display information to a display device 622 which may be separate from or integral to the computing-based device 604. The display information may provide a graphical user interface. An input interface 614 is arranged to receive and process input from one or more devices, such as a capture device 620, a synthetic image renderer which renders synthetic images from 3D models, a user input device such as a game controller 624, keyboard 626 or mouse 628.

Clause A. An image processing apparatus comprising:
a memory storing a region of interest of a synthetic image depicting an object from a class of objects;
a trained neural image generator having been trained to map embeddings from a multi-dimensional latent space to photorealistic images of objects in the class;
a processor arranged to compute a first embedding from the latent space, the first embedding corresponding to an image which is similar to the region of interest while maintaining photorealistic appearance;
the processor arranged to compute a second embedding from the latent space, the second embedding corresponding to an image which matches the synthetic image;
the processor arranged to blend the first embedding and the second embedding to form at least one blended embedding;
generating an output image from the blended embedding, the output image being a photorealistic version of the synthetic image. The output image is stored in some examples. The output image is displayed in some examples. The output image has the benefit of being a photorealistic version of the synthetic image which was computed in an efficient, controllable manner. Using the image processing apparatus large quantities of photorealistic images can be made for use as training data in other machine learning models. The photorealistic images are used for realistic avatars, realistic holograms in mixed reality displays, for use in cinematography, computer gaming and other applications.

Clause B. The image processing apparatus of clause A wherein the synthetic image has been rendered from a 3D model of an object and the output image is photorealistic. By rendering the synthetic image from a 3D model of an object it is possible to control attributes of the synthetic image but generally photorealism is poor. The apparatus of claim A enables a photorealistic version of the synthetic image to be obtained in a practical, efficient manner.

Clause C. The image processing apparatus of any preceding clause wherein the trained neural generator has been trained using only photorealistic images such that zero-shot learning is achieved whereby the trained neural generator takes as input an embedding computed from the synthetic image. Generally it is not straightforward to achieve zero-shot learning. The apparatus of clause A gives an effective way to achieve zero-shot learning.

Clause D. The image processing apparatus of any preceding clause wherein the first embedding corresponds to an image which is similar to but not the same as the region of interest. By using a first embedding in this way it is possible to retain photorealism.

Clause E. The image processing apparatus of any preceding clause wherein the first embedding is computed in parallel with computing the second embedding. Computing in parallel gives efficiency and promotes real time operation.

Clause F. The image processing apparatus of any preceding clause wherein the processor is arranged to compute the first embedding by sampling an approximate nearest neighbor from the latent space and then refining the approximate nearest neighbor. This is a practical and efficiency way of finding a first embedding which retains photorealism and is similar to the input synthetic image.

Clause G. The image processing apparatus of clause F wherein the processor is arranged to refine the approximate nearest neighbor by traversing the latent space while being constrained to adhere to a set of possible points in the latent space which correspond to photorealistic images when reconstructed by means of the trained neural renderer. This is a practical and efficiency way of finding a first embedding which retains photorealism and is similar to the input synthetic image.

Clause H. The image processing apparatus of clause G wherein the processor is arranged to traverse the latent space by iteratively combining the approximate nearest neighbor with samples drawn from the latent space, the combination being weighted according to optimized weights constrained to be a combination of samples from the latent space of the trained neural renderer. This is a practical and efficiency way of finding a first embedding which retains photorealism and is similar to the input synthetic image.

Clause I. The image processing apparatus of any preceding clause wherein the processor computes the sampling by selecting one of a plurality of specified centroids in the latent space. Using centroids facilitates ability of the output image to correspond with the synthetic image despite differences in attributes of the synthetic image and attributes of training images used to train the neural image generator. In this way bias control is facilitated in order to address any bias in the neural image generator as a result of its training data being biased.

Clause J. The image processing apparatus of clause I wherein the processor adds noise to the selected centroid and combines the centroid with one or more control vectors to vary attributes of an object depicted in an image corresponding to the centroid. Adding noise improves convergence speed and facilitates real time operation.

Clause K. The image processing apparatus of clause J wherein the processor repeats the operations of selecting a centroid and combining the centroid with one or more control vectors to obtain a plurality of samples and selects one of the samples by using a loss function which relates to similarity of the synthetic image region of interest and a corresponding region of interest generated from the sample using the neural image generator. Using centroids and control vectors facilitates ability of the output image to correspond with the synthetic image despite differences in attributes of the synthetic image and attributes of training images used to train the neural image generator. In this way bias control is facilitated in order to address any bias in the neural image generator as a result of its training data being biased.

Clause L. The image processing apparatus of any preceding clause wherein the processor is configured to generate a plurality of blended embeddings using different weights, and to generate an output image from each of the blended embeddings. Using weights in this way enables control of proportions of fine detail relative to coarse detail in the blended embedding.

Clause M. The image processing apparatus of clause L wherein the processor is configured to select one of the output images by computing a similarity metric between each output image and the synthetic image. This gives an effective and efficient way to select one of the output images.

Clause N. The image processing apparatus of any preceding clause wherein the synthetic image depicts a face with non-humanoid facial proportions and the output image depicts a visually plausible face. Generating photorealistic images of faces with non-humanoid proportions is a difficult problem and is useful for many practical applications such as computer games and film making.

Clause O. The image processing apparatus of any preceding clause wherein the object is a face. Images of human faces are especially challenging to generate with photorealism in a controllable manner yet the apparatus of clause A achieves this. Generating photorealistic images of human faces is a significant challenge in computer graphics. This is because of the complicated and varied appearance of human tissue found in the skin, eyes and teeth of the face region. The problem is further complicated by the fact that humans are highly attuned to the appearance of faces and thus skilled at spotting any unnatural aspect of a synthetic render.

Clause P. A computer-implemented method comprising:
storing, at a memory, a region of interest of a synthetic image depicting an object from a class of objects;
accessing a trained neural image generator having been trained to map embeddings from a multi-dimensional latent space to photorealistic images of objects in the class;
computing a first embedding from the latent space, the first embedding corresponding to an image which is similar to the region of interest while maintaining photorealistic appearance;
computing a second embedding from the latent space, the second embedding corresponding to an image which matches the synthetic image;
blending the first embedding and the second embedding to form a blended embedding;
generating at least one output image from the blended embedding, the output image being a photorealistic version of the synthetic image.

Clause Q. The computer-implemented method of clause P comprising computing the first embedding by sampling an approximate nearest neighbor from the latent space and then refining the approximate nearest neighbor.

Clause R. The computer-implemented method of clause P or clause Q comprising refining the approximate nearest neighbor by combining the approximate nearest neighbor with samples drawn from the latent space, the combination being weighted according to optimized weights.

Clause S. The computer-implemented method of any of clauses P to R wherein the object is a face.

Clause T. One or more device-readable media with device-executable instructions that, when executed by a computing system, direct the computing system to perform operations comprising:

storing, at a memory, a region of interest of a synthetic image depicting an object from a class of objects;

accessing a trained neural image generator having been trained to map embeddings from a multi-dimensional latent space to photorealistic images of objects in the class;

computing a first embedding from the latent space, the first embedding corresponding to an image which is similar to but not the same as the region of interest while maintaining photorealistic appearance;

computing a second embedding from the latent space, the second embedding corresponding to an image which matches the synthetic image;

blending the first embedding and the second embedding to form a blended embedding;

generating at least one output image from the blended embedding, the output image being a photorealistic version of the synthetic image.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An image processing apparatus comprising:
  a memory storing a region of interest of a synthetic image depicting an object from a class of objects;
  a trained neural image generator having been trained to map embeddings from a multi-dimensional latent space to photorealistic images of objects in the class; and
  a processor arranged to:
    compute a first embedding from the latent space, the first embedding being computed by selecting an initial point embedding in the latent space which generates an image similar to the region of interest and by iteratively combining the initial point embedding with other samples from the latent space to produce the first embedding;
compute a second embedding from the latent space, the second embedding corresponding to the synthetic image; and
blend the first embedding and the second embedding to form a blended embedding,
wherein the trained neural image generator further generates an output image from the blended embedding.

2. The image processing apparatus of claim 1, wherein the processor is arranged to compute the first embedding by sampling an approximate nearest neighbor from the latent space and then refining the sampled approximate nearest neighbor.

3. The image processing apparatus of claim 2, wherein the processor is arranged to refine the approximate nearest neighbor based on:
traversing the latent space while being constrained to adhere to a set of possible points in the latent space which correspond to photorealistic images when reconstructed by the trained neural image generator.

4. The image processing apparatus of claim 3, wherein the processor is arranged to traverse the latent space by:
iteratively combining the approximate nearest neighbor with samples drawn from the latent space, the combination being weighted according to optimized weights constrained to be a combination of samples from the latent space of the trained neural image generator.

5. The image processing apparatus of claim 2, wherein the processor further computes the sampling by:
selecting one of a plurality of specified centroids in the latent space.

6. The image processing apparatus of claim 5, wherein the processor further:
adds noise to the selected centroid, and
combines the centroid with a control vector to vary attributes of an object depicted in an image corresponding to the centroid.

7. The image processing apparatus of claim 6, wherein the processor further:
repeats selecting the centroid and combining the centroid with one or more control vectors to obtain a plurality of samples, and
selects one of the samples by using a loss function which relates to similarity of the image region of interest and a corresponding region of interest generated from the sample using the neural image generator.

8. The image processing apparatus of claim 1, wherein the processor is arranged to optimize the combination using a loss function to produce the first embedding.

9. The image processing apparatus of claim 1, wherein the processor further computes the second embedding by:
evaluating a sampling of points in the latent space using a loss function.

10. The image processing apparatus of claim 1, wherein the processor further computes the second embedding by:
using a brute force search to obtain a latent code that matches the synthetic image.

11. A computer-implemented method comprising:
storing, at a memory, a region of interest of a synthetic image depicting an object from a class of objects;
accessing a trained neural image generator having been trained to map embeddings from a multi-dimensional latent space to photorealistic images of objects in the class;
computing a first embedding from the latent space, the first embedding being computed by selecting an initial point embedding in the latent space which generates an image similar to the region of interest and by iteratively combining the initial point embedding with other samples from the latent space to produce the first embedding;
computing a second embedding from the latent space, the second embedding corresponding to the synthetic image;
blending the first embedding and the second embedding to form a blended embedding; and
generating an output image from the blended embedding.

12. The computer-implemented method of claim 11, wherein computing the first embedding further comprises:
sampling an approximate nearest neighbor from the latent space and then refining the sampled approximate nearest neighbor.

13. The computer-implemented method of claim 12, wherein refining the approximate nearest neighbor further comprises:
traversing the latent space while being constrained to adhere to a set of possible points in the latent space which correspond to photorealistic images when reconstructed by the trained neural image generator.

14. The computer-implemented method of claim 13, wherein traversing the latent space further comprises:
iteratively combining the approximate nearest neighbor with samples drawn from the latent space, the combination being weighted according to optimized weights constrained to be a combination of samples from the latent space of the trained neural image generator.

15. The computer-implemented method of claim 12, wherein computing the sampling further comprises:
selecting one of a plurality of specified centroids in the latent space.

16. The computer-implemented method of claim 15, further comprising:
adding noise to the selected centroid, and
combining the centroid with a control vector to vary attributes of an object depicted in an image corresponding to the centroid.

17. The computer-implemented method of claim 16, further comprising:
repeating selecting the centroid and combining the centroid with one or more control vectors to obtain a plurality of samples, and
selecting one of the samples by using a loss function which relates to similarity of the image region of interest and a corresponding region of interest generated from the sample using the neural image generator.

18. The computer-implemented method of claim 11, wherein computing the second embedding further comprises:
evaluating a sampling of points in the latent space using a loss function.

19. The computer-implemented method of claim 11, wherein computing the second embedding further comprises:
using a brute force search to obtain a latent code that matches the synthetic image.

20. One or more device-readable media with device-executable instructions that, when executed by a computing system, direct the computing system to perform operations comprising:
storing, at a memory, a region of interest of a synthetic image depicting an object from a class of objects;

accessing a trained neural image generator having been trained to map embeddings from a multi-dimensional latent space to photorealistic images of objects in the class;

computing a first embedding from the latent space, the first embedding being computed by selecting an initial point embedding in the latent space which generates an image similar to the region of interest and by iteratively combining the initial point embedding with other samples from the latent space to produce the first embedding;

computing a second embedding from the latent space, the second embedding corresponding to the synthetic image;

blending the first embedding and the second embedding to form a blended embedding; and generating at least one output image from the blended embedding.

* * * * *